United States Patent
Kalirajan et al.

(10) Patent No.: US 12,039,780 B2
(45) Date of Patent: Jul. 16, 2024

(54) VIDEO SURVEILLANCE SYSTEM WITH VANTAGE POINT TRANSFORMATION

(71) Applicant: HONEYWELL INTERNATIONAL INC., Charlotte, NC (US)

(72) Inventors: Arun Manikandan Kalirajan, Charlotte, NC (US); Bhupesh Koli, Charlotte, NC (US); Jitendra Sitaram Chaurasia, Charlotte, NC (US); Mourian Balasubramanian, Charlotte, NC (US); Lalitha M. Eswara, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/661,847

(22) Filed: May 3, 2022

(65) Prior Publication Data
US 2022/0351519 A1    Nov. 3, 2022

(30) Foreign Application Priority Data
May 3, 2021    (IN) .............................. 202111020181

(51) Int. Cl.
*G06V 20/17*    (2022.01)
*B64C 39/02*    (2023.01)
(Continued)

(52) U.S. Cl.
CPC ............ *G06V 20/52* (2022.01); *B64C 39/024* (2013.01); *G06V 20/17* (2022.01); *H04N 23/695* (2023.01);
(Continued)

(58) Field of Classification Search
CPC .... H04N 7/181; H04N 13/117; H04N 13/111; H04N 23/695; H04N 23/951;
(Continued)

(56) References Cited

U.S. PATENT DOCUMENTS 8,270,767 B2 *   9/2012   Park .................... H04N 23/661
                                                      382/284
8,428,391 B2 *   4/2013   Park .................... H04N 23/661
                                                      382/284
(Continued)

FOREIGN PATENT DOCUMENTS

EP          3633598 A1      4/2020
KR       20200143276       12/2020

OTHER PUBLICATIONS

Stansberry, "How to Create an Architectural Drawing," 9 pages, Updated Apr. 25, 2017, Accessed Feb. 4, 2021.
(Continued)

*Primary Examiner* — Christopher S Kelley
*Assistant Examiner* — Asmamaw G Tarko
(74) *Attorney, Agent, or Firm* — Seager, Tufte & Wickhem, LLP

(57) ABSTRACT

A method for monitoring a surveillance area includes receiving a plurality of video streams that are captured by a plurality of video cameras in the surveillance area, each of the plurality of video streams capturing one or more objects in the surveillance area that are within a camera field of view (FOV) of the corresponding video camera and from a camera vantage point of the corresponding video camera. A vantage point transformation is applied to each of two or more objects captured in two or more of the plurality of video streams, the vantage point transformation transforming a view of each of the two or more objects from the camera vantage point of the corresponding video camera to a common vantage point. The transformed view of each of the two or more objects from the common vantage point is rendered on a display.

14 Claims, 17 Drawing Sheets

(51) Int. Cl.
  *B64U 101/30* (2023.01)
  *G06V 20/52* (2022.01)
  *H04N 23/695* (2023.01)
  *H04N 23/951* (2023.01)
(52) U.S. Cl.
  CPC ....... *H04N 23/951* (2023.01); *B64U 2101/30* (2023.01); *B64U 2201/20* (2023.01)
(58) Field of Classification Search
  CPC ...... G06V 20/52; G06V 20/17; B64C 39/024; B64U 2201/20; B64U 2101/30
  USPC .......................................................... 348/144
  See application file for complete search history.

(56) References Cited

U.S. PATENT DOCUMENTS

| | | | |
|---|---|---|---|
| 9,672,586 | B2 | 6/2017 | Sundareson et al. |
| 9,992,400 | B2 | 6/2018 | Burtey et al. |
| 10,750,153 | B2 | 8/2020 | Sadi et al. |
| 11,113,841 | B1* | 9/2021 | Zelenskiy ................ G06T 7/74 |
| 11,483,520 | B1* | 10/2022 | Morris ..................... H04N 7/18 |
| 2009/0092334 | A1* | 4/2009 | Shulman ................ G06T 11/00 |
| | | | 382/284 |
| 2009/0262206 | A1* | 10/2009 | Park ....................... H04N 23/66 |
| | | | 348/584 |
| 2015/0158513 | A1* | 6/2015 | Costa .................... B61L 23/041 |
| | | | 348/144 |
| 2016/0068267 | A1* | 3/2016 | Liu ......................... G05D 1/042 |
| | | | 701/4 |
| 2016/0217698 | A1* | 7/2016 | Liu ........................ B64C 39/024 |
| 2016/0236638 | A1* | 8/2016 | Lavie ...................... G08G 1/012 |
| 2018/0025498 | A1* | 1/2018 | Omari ..................... G06T 7/248 |
| | | | 348/144 |
| 2018/0300590 | A1* | 10/2018 | Briggs .................... G06F 18/28 |
| 2019/0188814 | A1* | 6/2019 | Kreitzer ................ H04W 12/02 |
| 2019/0206269 | A1* | 7/2019 | Chen ....................... H04N 7/185 |
| 2020/0110947 | A1* | 4/2020 | Nakayama ............... B60R 1/00 |
| 2020/0154048 | A1 | 5/2020 | Jones et al. |
| 2020/0255141 | A1* | 8/2020 | Lavie ..................... G06V 20/17 |
| 2022/0348321 | A1* | 11/2022 | Hunt ...................... B64D 47/00 |

OTHER PUBLICATIONS

Extended European Search Report, EP Application No. 22169237.9, European Patent Office, Sep. 23, 2022 (7 pages).
India Examination Report, India Patent Office, IN Application No. 202111020181, Aug. 3, 2023 (9 pages).

* cited by examiner

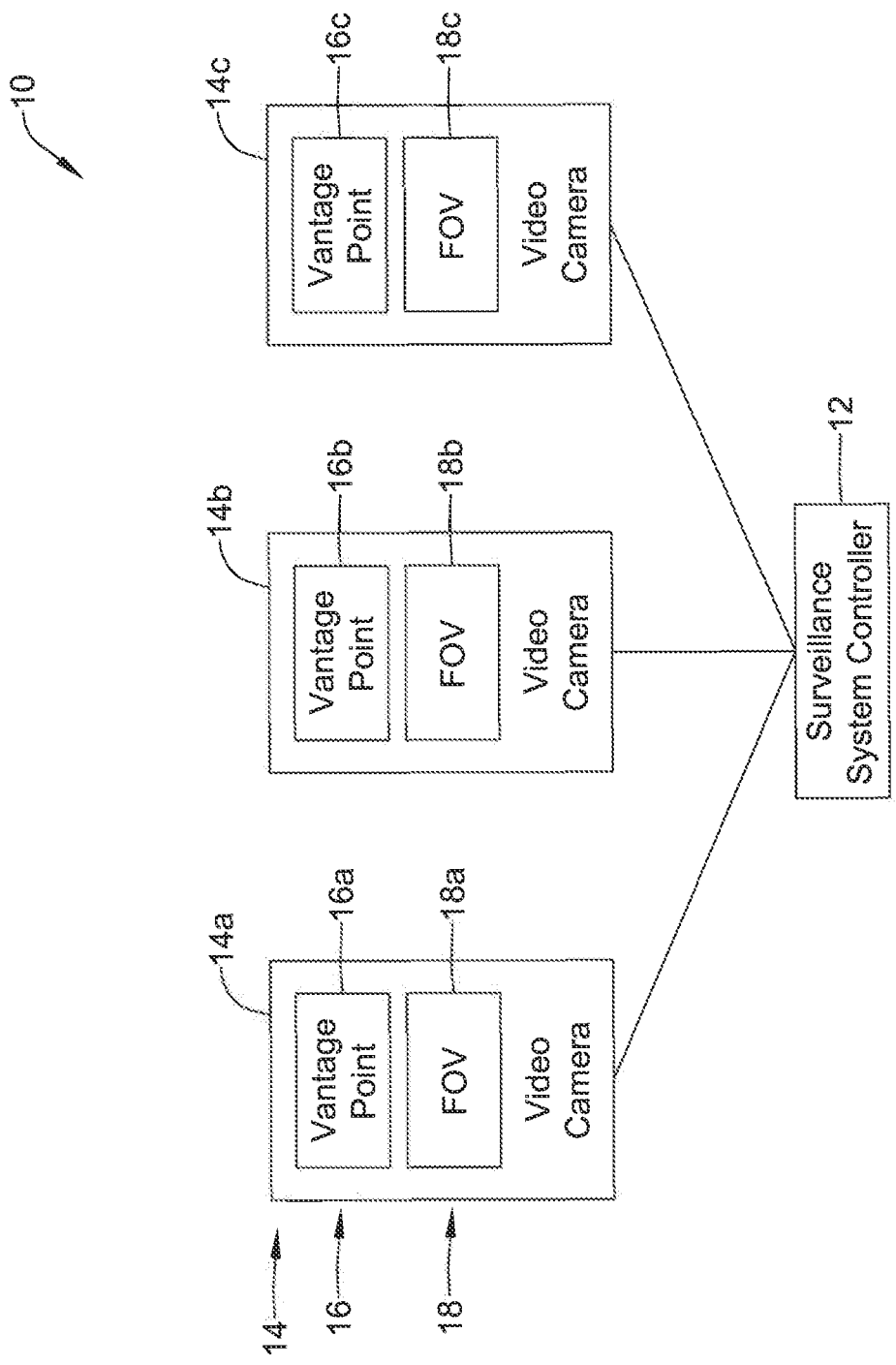

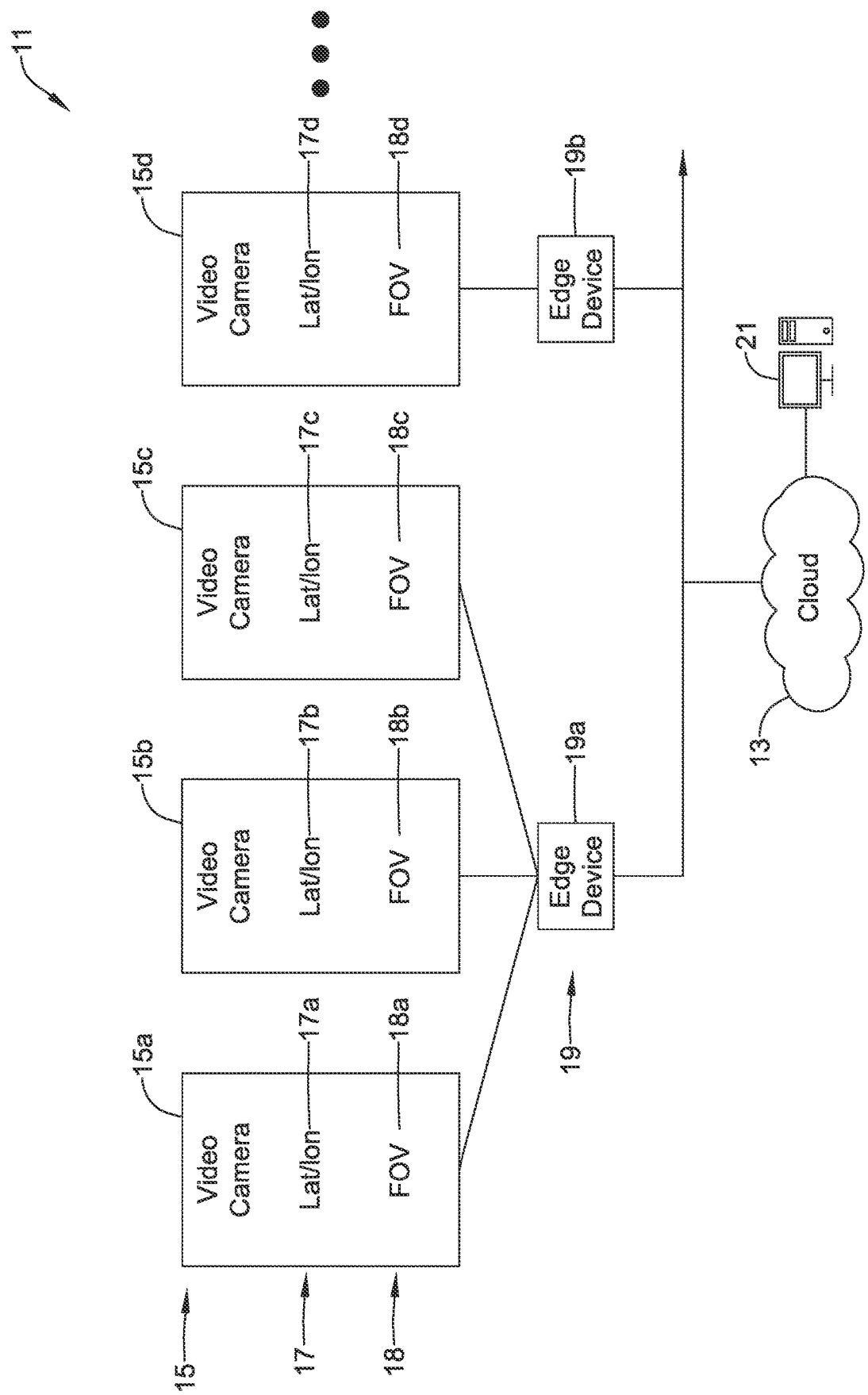

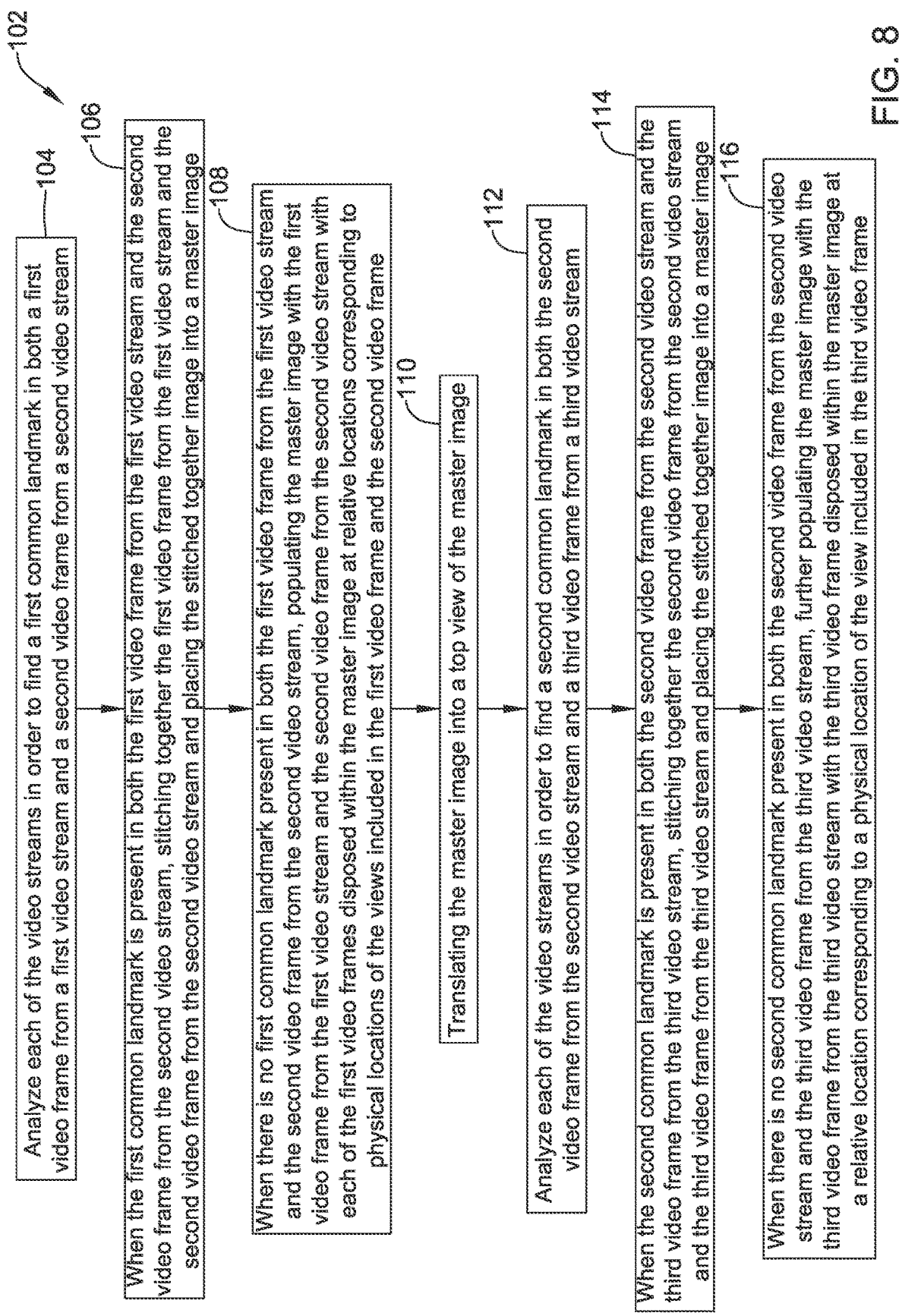

```
                    ┌─────────────────────────────────────────────────┐
                    │ The surveillance system controller analyzing    │
                    │ video streams provided by the plurality of      │──120
                    │ video cameras in order to find a common         │
                    │ landmark in a first video frame from a first    │
                    │ video stream and a second video frame from a    │
                    │ second video stream                             │
                    └─────────────────────────────────────────────────┘
                                        │
                                        ▼
                    ┌─────────────────────────────────────────────────┐
                    │ When the common landmark is present in both     │──122
                    │ the first video frame from the first video      │
                    │ stream and the second video frame from the      │
                    │ second video stream, the surveillance system    │
                    │ controller stitching together the first video   │
                    │ frame from the first video stream and the       │
                    │ second video frame from the second video        │
                    │ stream and placing the stitched together image  │
                    │ into a master image                             │
                    └─────────────────────────────────────────────────┘
                                        │
                                        ▼
                    ┌─────────────────────────────────────────────────┐
                    │ When there is no first common landmark present  │──124
                    │ in both the first video frame from the first    │
                    │ video stream and the second video frame from    │
                    │ the second video stream, populating the master  │
                    │ image with the first video frame from the first │
                    │ video stream and the second video frame from    │
                    │ the second video stream with each of the first  │
                    │ video frames disposed within the master image   │
                    │ at relative locations corresponding to physical │
                    │ locations of the views included in the first    │
                    │ video frame and the second video frame          │
                    └─────────────────────────────────────────────────┘
                                        │
                                        ▼
                    ┌─────────────────────────────────────────────────┐
                    │ The surveillance system controller translating  │──126
                    │ the master image into a top view of the master  │
                    │ image                                           │
                    └─────────────────────────────────────────────────┘
```

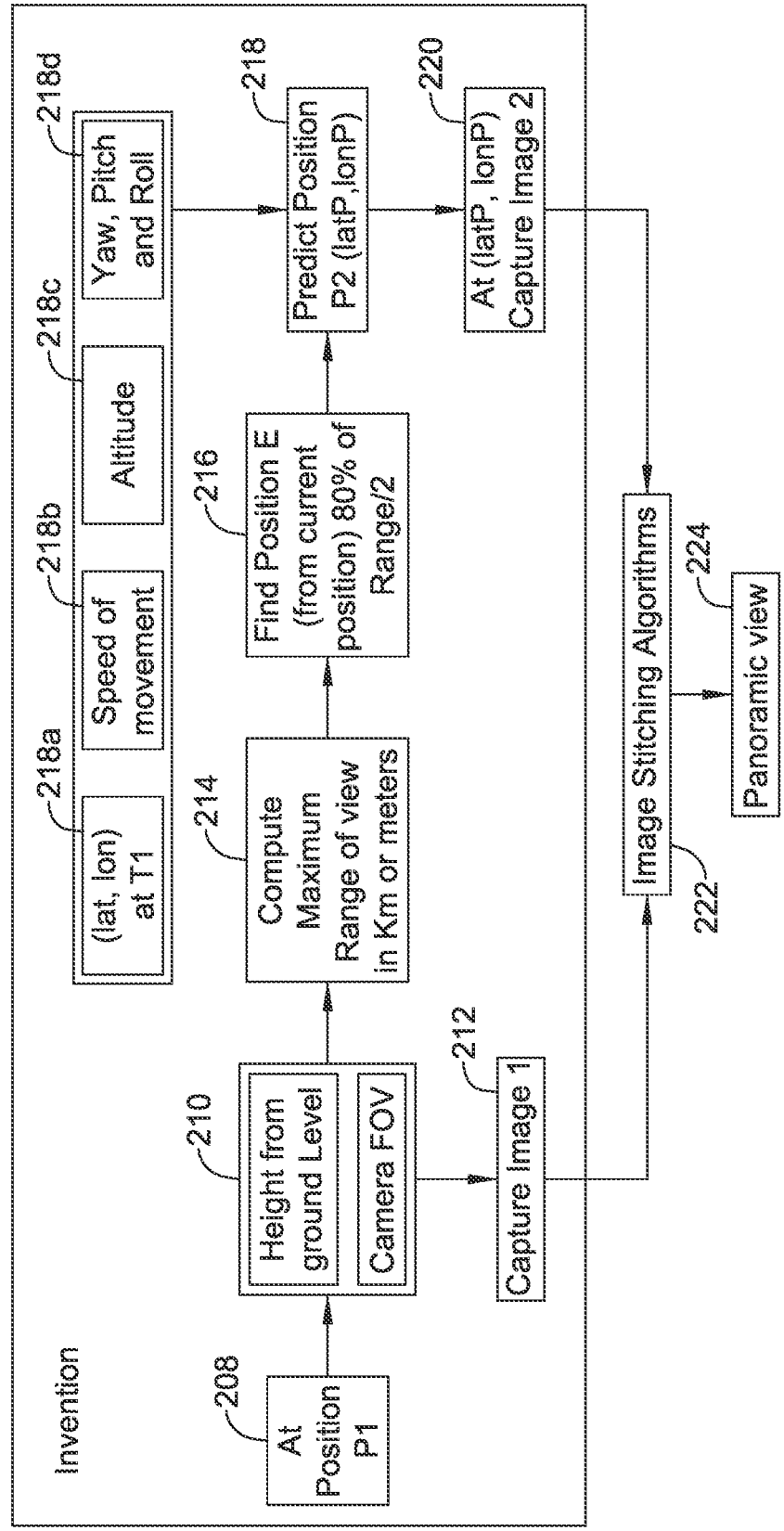
FIG. 15

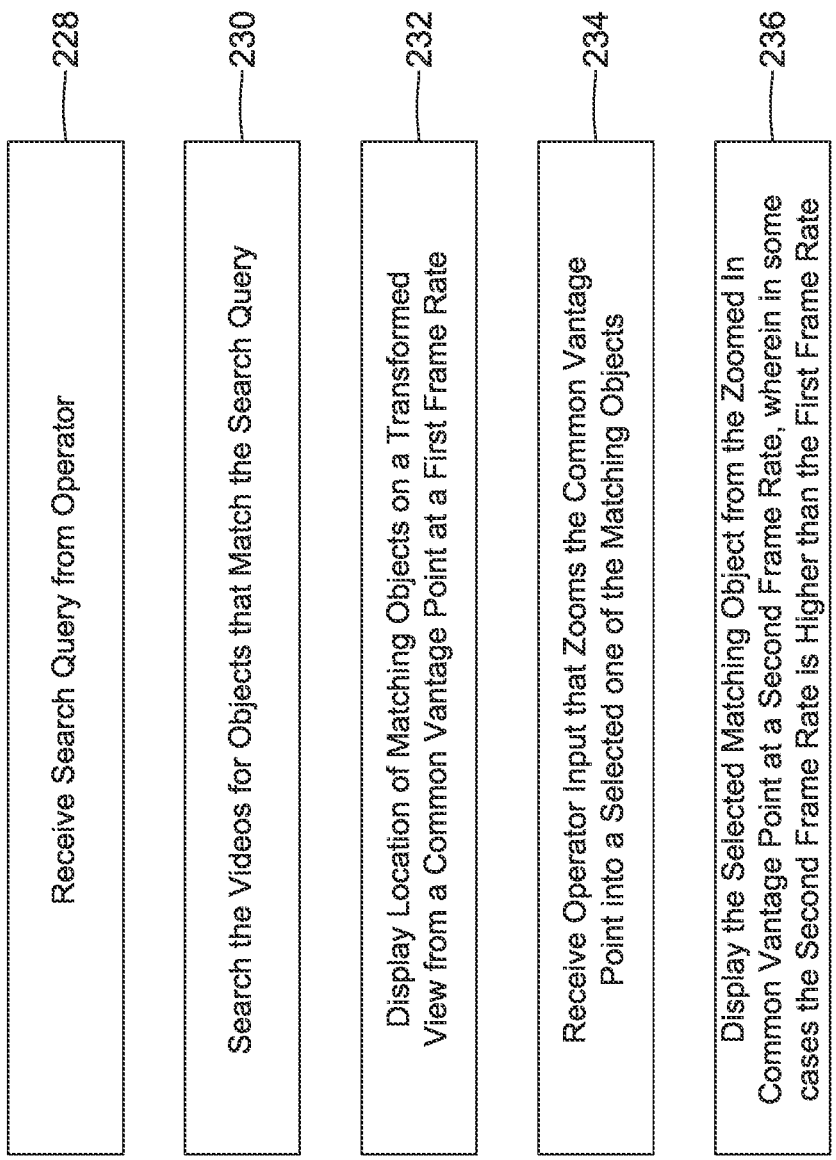

VIDEO SURVEILLANCE SYSTEM WITH VANTAGE POINT TRANSFORMATION

CROSS-REFERENCE TO RELATED APPLICATIONS

This application claims priority pursuant to 35 U.S.C. 119(a) to India Patent Application No. 202111020181, filed May 3, 2021, which application is incorporated herein by reference in its entirety.

TECHNICAL FIELD

The present disclosure relates generally to video surveillance systems. More particularly, the present disclosure relates to video surveillance systems that enable vantage point transformations.

BACKGROUND

A number of video surveillance systems employ video cameras that are installed or otherwise arranged around a surveillance area such as a city, a portion of a city, a facility or a building. Video surveillance systems may also include mobile video cameras, such as drones carrying video cameras. Each video camera has a vantage point that corresponds to its physical location and a field of view that corresponds to what can be seen by that particular video camera at its particular physical location. In the case of a mobile video camera, it will be appreciated that its vantage point can change. What would be desirable is a way to combine video images from a plurality of the video cameras and perform a vantage point transformation to provide a "birds eye" view of the surveillance area that is controllable by an operator.

SUMMARY

The present disclosure relates to video surveillance systems. In an example, a method for monitoring a surveillance area is provided. The method includes receiving a plurality of video streams that are captured by a plurality of video cameras in the surveillance area, wherein each of the plurality of video cameras has a camera vantage point and a camera field of view (FOV). Each of the plurality of video streams captures one or more objects in the surveillance area that are within the camera FOV of the corresponding video camera and from the camera vantage point of the corresponding video camera. A vantage point transformation is applied to each of two or more objects captured in two or more of the plurality of video streams. The vantage point transformation transforming a view of each of the two or more objects from the camera vantage point of the corresponding video camera to a common vantage point. The transformed view of each of the two or more objects from the common vantage point is then rendered on a display. In some cases, video streams from two or more video cameras are stitched together to produce the view of one or more of the objects.

In another example, performing a search may include receiving a search query from an operator. In response, a number of videos may be searched for objects that meet the search query. The location of matching objects may be displayed on a transformed view from a common vantage point at a first frame rate. Operator input may be received that zooms the common vantage point into a selected one of the matching objects. The selected matching object from the zoomed-in common vantage point may be displayed at a second frame rate that may or may not be higher than the first frame rate.

In another example, a method of operating a surveillance system that includes a plurality of video cameras is provided. Each of the video cameras is configured to provide video streams from a corresponding camera vantage point, and the surveillance system includes a surveillance system controller. The surveillance system controller may be centrally provided, such as in the cloud, or may be distributed such as among edge controllers at or near the various video cameras. The illustrative method includes the surveillance system controller analyzing video streams provided by the plurality of video cameras in order to find a common object in a first video frame from a first video stream and a second video frame from a second video stream. The common object is tagged with an object identifier. View information for the tagged common object that includes view information from the camera vantage point of each of the first video stream and the second video stream is stored. A vantage point transformation is applied to the common object, the vantage point transformation transforming the view information for the common object from the camera vantage points of the first video stream and the second video stream to a common vantage point. The transformed view information of the common object from the common vantage point is rendered on a display. User input may be received to move the common vantage point to an updated common vantage point, and once moved, the vantage point transformation is applied using the updated common vantage point and the transformed view information of the common object is rendered from the updated common vantage point.

In another example, a drone is configured for use in a surveillance system. The drone includes a video camera having a camera Field of View (FOV), a memory, a transceiver and a controller that is operably coupled to the video camera, the memory and the transceiver. The controller is configured to capture a first frame of a video of an incident at a first location using the video camera, and to determine a flight path to follow the incident. The controller is configured to fly the drone along the flight path and to capture a second frame of the video of the incident at a second location using the video camera, wherein the second location is determined such that that there is an overlap in the camera Field of View (FOV) between the first frame of the video and the second frame of the video. The controller is configured to transmit the resulting video via the transceiver.

In another example, a surveillance system is configured to provide surveillance of a surveillance area. The surveillance system includes a plurality of video cameras disposed within the surveillance area. Each of the plurality of video cameras is configured to capture and store a video stream corresponding to a field of view of the particular video camera. A surveillance system monitoring controller is operably coupled with each of the plurality of video cameras via a high speed wireless network. The surveillance system monitoring controller includes a high speed input configured to receive video streams from one or more of the plurality of video cameras via the high speed wireless network, a memory operably coupled to the high speed input and configured to store the received video streams, and a controller that is operably coupled to the high speed input and to the memory. The controller is configured to analyze each of the video streams in order to find a first common landmark in both a first video frame from a first video stream and a second video frame from a second video stream. When the first common landmark is present in both the first video frame from the first video stream and the second video frame from the second video stream, the controller is configured to stitch together the first video frame from the first video stream and the second video frame from the second video stream and place the stitched together image into a master image. When there is no first common landmark present in both the first video frame from the first video stream and the second video frame from the second video stream, the controller is configured to populate the master image with the first video frame from the first video stream and the second video frame from the second video stream with each of the first video frames disposed within the master image at relative locations corresponding to physical locations of the views included in the first video frame and the second video frame. The controller is configured to transform the master image into a top view of the master image using an image transformation.

In another example, a method of operating a surveillance system that includes a surveillance system controller and a plurality of video cameras that are configured to provided video streams is provided. The illustrative method includes the surveillance system controller analyzing video streams provided by the plurality of video cameras in order to find a common landmark in a first video frame from a first video stream and a second video frame from a second video stream. When the common landmark is present in both the first video frame from the first video stream and the second video frame from the second video stream, the surveillance system controller stitches together the first video frame from the first video stream and the second video frame from the second video stream and places the stitched together image into a master image. When there is no common landmark present in both the first video frame from the first video stream and the second video frame from the second video stream, the surveillance system controller populates the master image with the first video frame from the first video stream and the second video frame from the second video stream with each of the first video frames disposed within the master image at relative locations corresponding to physical locations of the views included in the first video frame and the second video frame. The surveillance system controller translates the master image into a top view of the master image.

In another example, a drone is configured for use in a surveillance system that includes a plurality of video cameras disposed within a surveillance area. The drone includes a video camera, a memory, a cellular transceiver, and a controller that is operably coupled to the video camera, the memory and the cellular transceiver. The controller is configured to receive instructions to fly to a particular location at which an incident is believed to be occurring and to capture a first video frame of the incident using the video camera. The controller is configured to fly to a second location away from the particular location to follow the incident, to determine a time to capture a second video frame of the incident such that there is sufficient overlap between the first video frame and the second video frame to be able to stitch together the first video fame and the second video frame and to capture a second video frame of the incident. The controller is configured to stitch together the first video frame and the second video frame to create a stitched video image and to transmit the stitched video image via the cellular transceiver.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 1A is a schematic block diagram of an illustrative surveillance system;

FIG. 1B is a schematic block diagram of an illustrative surveillance system;

FIG. 8 is a flow diagram showing an illustrative method that may be carried out via the illustrative surveillance system controller of FIG. 7;

FIG. 9 is a flow diagram showing an illustrative method;

FIGS. 13 through 15 are flow diagrams showing illustrative methods; and

FIG. 16 is a schematic block diagram showing a series of steps that may be carried out in performing a video search.

Figure 2:
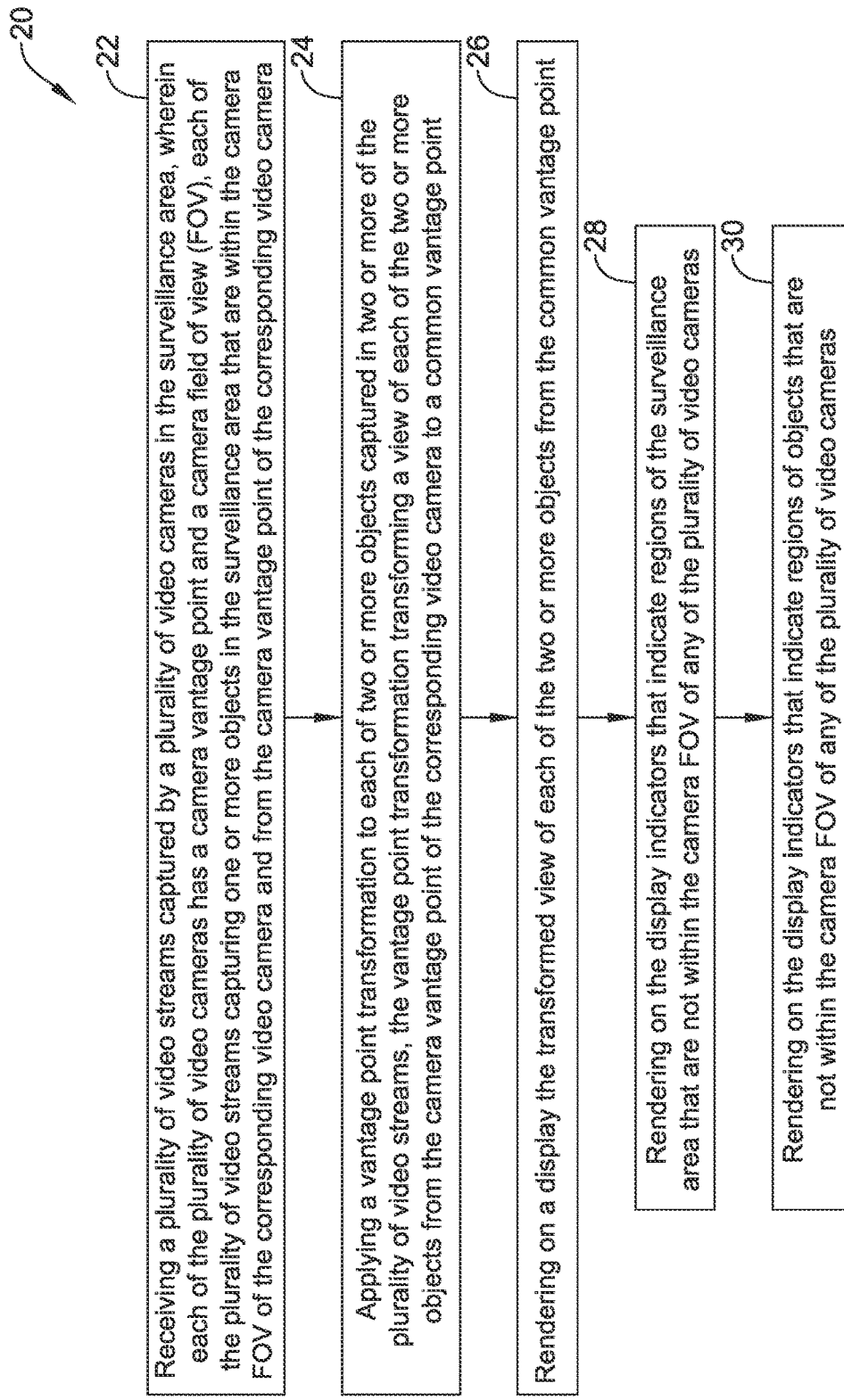
FIGS. 2 through 6 are flow diagrams showing illustrative methods that may be carried out via the illustrative surveillance systems of FIGS. 1A and 1B.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1A is a schematic block diagram of an illustrative surveillance system 10 that is configured to provide surveillance of a surveillance area. The illustrative surveillance system 10 includes a surveillance system controller 12 and a plurality of video cameras 14 that are disposed within the surveillance area. The video cameras 14 are individually labeled as 14a, 14b, 14c. While a total of three video cameras are illustrated, it will be appreciated that the surveillance system 10 may include hundreds or even thousands of video cameras 14 that are disposed about a smart city, for example. At least some of the video cameras 14 may be fixed video cameras, meaning that they are each installed at a fixed location. At least some of the video cameras 14 may be mobile video cameras that are configured to move about within the surveillance area. For example, at least some of the video cameras 14 may be mounted within drones that are configured to fly around within the surveillance area, thereby providing video cameras at various locations and/or vertical positions within the surveillance area. In some cases, the mobile video cameras may be dash cameras of emergency vehicles, body cameras of emergency personnel such as police, and/or portable or wearable devices carried by citizens. These are just examples.

Each of the video cameras 14 include a vantage point 16 and a field of view (FOV) 18. The vantage points 16 are individually labeled as 16a, 16b, 16c and the FOVs 18 are individually labeled as 18a, 18b, 18c. For each video camera 14, its vantage point 16 may be defined at least in part upon where it is mounted, if permanently secured, or currently located, if it is mobile. For example, a particular video camera 14 may be mounted on the exterior of a building at the intersection of First Street and Main, at a height of ten feet. This mounting location may be considered as defining its vantage point 16. As another example, a particular video camera 14 may be mounted at the intersection of Third Street and Sixteenth Avenue and at a height of twenty five feet such as on the exterior of a building or on a light post. This particular video camera 14 (mounted at a different location and a different height of twenty five feet) may be considered as having a vantage point 16 that is different from the vantage point 16 of the video camera that is mounted at a height of ten feet. A video camera 14 mounted to a drone will have yet a different vantage point 16.

Some of the video cameras 14 may have a fixed FOV 18 that is dictated by where and how the cameras are installed, the lens installed on the camera, and so on. Some of the video cameras may have, for example, a 120 degree FOV or a 360 degree FOV. Some of the video cameras 14 may have a FOV 18 that is adjustable. For example, some of the video cameras 14 may be Pan, Tilt and Zoom (PTZ) cameras that can adjust their FOV by adjusting one or more of the Pan, the Tilt and the Zoom of the particular video cameras 14.

The surveillance system controller 12 may be configured to control at least some aspects of operation of the surveillance system 10. For example, the surveillance system controller 12 may be configured to provide instructions to at least some of the video cameras 14 to transmit video, for example, or to change one or more of the Pan, the Tilt and the Zoom of video cameras 14 that are PTZ cameras. The surveillance system controller 12 may be configured to control operation of any mobile video cameras that is part of the surveillance system 10. The surveillance system controller 12 may be configured to carry out a number of different methods. FIGS. 2 through 6 are flow diagrams showing illustrative methods that may be orchestrated by the surveillance system controller 12 and thus carried out by the surveillance system 10.

FIG. 1B is a schematic block diagram of an illustrative surveillance system 11 that is configured to provide surveillance of a surveillance area. The surveillance system 11 may include a plurality of video cameras 15 that are disposed within the surveillance area. The video cameras 15 are individually labeled as 15a, 15b, 15c, 15d. While a total of four video cameras 15 are illustrated, it will be appreciated that the surveillance system 11 may include hundreds or even thousands of video cameras 15 that are disposed about a smart city, for example. At least some of the video cameras 15 may be fixed video cameras, meaning that they are each installed at a fixed location. At least some of the video cameras 15 may be mobile video cameras that are configured to move about within the surveillance area. For example, at least some of the video cameras 15 may be mounted within drones that are configured to fly around within the surveillance area, thereby providing video cameras at various locations and/or vertical positions within the surveillance area. In some cases, the mobile video cameras may be dash cameras of emergency vehicles, body cameras of emergency personnel such as police, and/or portable or wearable devices carried by citizens. These are just examples.

Each of the video cameras 15 include a location 17 that may be given in terms of latitude and longitude and a field of view (FOV) 18. The locations 17 are individually labeled as 17a, 17b, 17c, 17d and the FOVs 18 are individually labeled as 18a, 18b, 18c, 18d. For each video camera 15, its location 17 may be defined at least in part upon where it is mounted, if permanently secured, or currently located, if it is mobile. Some of the video cameras 15 may have a fixed FOV 18 that is dictated by where and how the cameras are installed, the lens installed on the camera, and so on. Some of the video cameras 15 may have, for example, a 120 degree FOV or a 360 degree FOV. Some of the video cameras 15 may have a FOV 18 that is adjustable. For example, some of the video cameras 15 may be Pan, Tilt and Zoom (PTZ) cameras that can adjust their FOV by adjusting one or more of the Pan, the Tilt and the Zoom of the particular video cameras 15.

The surveillance system 11 includes one or more edge devices 19. Two edge devices 19 are shown, individually labeled as 19a and 19b. It will be appreciated that there may be a substantially greater number of edge devices 19, for example. As shown, the video cameras 15a, 15b and 15c are operably coupled with the edge device 19a and the video camera 15d (and possibly others) are operably coupled with the edge device 19b. In some cases, the edge devices 19 may provide some of the functionality described with respect to the surveillance system controller 12 (FIG. 1A). Some of the functionality described with respect to the surveillance system controller 12 may be provided by a cloud-based server 13 and/or a computer or workstation 21 that is operably coupled to the edge devices 19 via the cloud-based server 13. The functionality of the surveillance system controller 12 may be centrally provided, such as via the cloud-based server 13, or may be distributed between the edge devices 19 that can be located at or near the various video cameras 15.

In some cases, each edge device 19 may be an edge controller. In some cases, each edge device 19 may be configured to control operation of each of the video cameras 15 that are operably coupled with that particular edge device 19. A particular edge device 19 may be programmed with or otherwise learn details pertaining to the particular video cameras 15 that are operably coupled with that particular edge device 19. Stitching together videos, as will be discussed, may occur within one or more of the edge devices 19, for example, or could occur within the cloud-based server 13 and/or the computer or workstation 21.

The cloud-based server 13, the computer or workstation 21 and/or one or more of the edge devices 19 may be configured to control at least some aspects of operation of the surveillance system 11. For example, the cloud-based server 13, the computer or workstation 21 and/or one or more of the edge devices 19 may be configured to provide instructions to at least some of the video cameras 15 to transmit video, for example, or to change one or more of the Pan, the Tilt and the Zoom of video cameras 15 that are PTZ cameras. The cloud-based server 13, the computer or workstation 21 and/or one or more of the edge devices 19 may be configured to control operation of any mobile video cameras that is part of the surveillance system 11. The cloud-based server 13, the computer or workstation 21 and/or one or more of the edge devices 19 may be configured to carry out a number of different methods. FIGS. 2 through 6 are flow diagrams showing illustrative methods that may be orchestrated by the surveillance system controller 12 and thus carried out by the surveillance system 10. Alternatively, the illustrative methods shown in FIGS. 2 through 6 may also be orchestrated and thus carried out via the cloud-based server 13, the computer or workstation 21 and/or one or more of the edge devices 19.

FIG. 2 is a flow diagram showing an illustrative method 20 for monitoring a surveillance area. The method 20 includes receiving a plurality of video streams captured by a plurality of video cameras (such as the video cameras 14) in the surveillance area, wherein each of the plurality of video cameras has a camera vantage point (such as the vantage point 16) and a camera field of view (FOV) (such as the FOV 18). Each of the plurality of video streams capturing one or more objects in the surveillance area that are within the camera FOV of the corresponding video camera and from the camera vantage point of the corresponding video camera, as indicated at block 22. A vantage point transformation may be applied to each of two or more objects captured in two or more of the plurality of video streams, the vantage point transformation transforming a view of each of the two or more objects from the camera vantage point 16 of the corresponding video camera to a common vantage point, as indicated at block 24. The common vantage point may correspond to a "birds eye" view of the surveillance area that can be moved and/or otherwise controlled by an operator of the surveillance system. The transformation may include a geometric transformation from each of the camera vantage points to the common vantage point.

In one example, say that the camera vantage point 16 of a first video camera 14 corresponds to a particular location and a height of ten feet and the camera vantage point 16 of a second video camera 14 corresponds to a position fifty yards south of the position of the first video camera 14 and a height of twenty five feet. The common vantage point may correspond to the camera vantage point of one of the video cameras 14, or the common vantage point may correspond to a different position, such as a "birds eye" view of the surveillance area that can be moved and/or otherwise controlled by an operator of the surveillance system. Perhaps there is a desire for the common vantage point to correspond to a location intermediate the first video camera 14 and the second video camera 14, and at a height intermediate the two. In another example, the common vantage point may correspond to a substantially greater vertical height, such as a top view or a desired birds eye view of the area.

The transformed view of each of the two or more objects from the common vantage point may be rendered on a display, as indicated at block 26. In some instances, the method 20 may further include rendering on the display indicators that indicate regions of the surveillance area that are not within the camera FOV of any of the plurality of video cameras, as indicated at block 28. The method 20 may, for example, additionally or alternatively include rendering on the display indicators that indicate regions of objects and/or regions of the surveillance area that are not within the camera FOV of any of the plurality of video cameras, as indicated at block 30. This notifies an operator of areas of the surveillance area that are not covered by the video cameras of the surveillance system 10.

Figure 3:
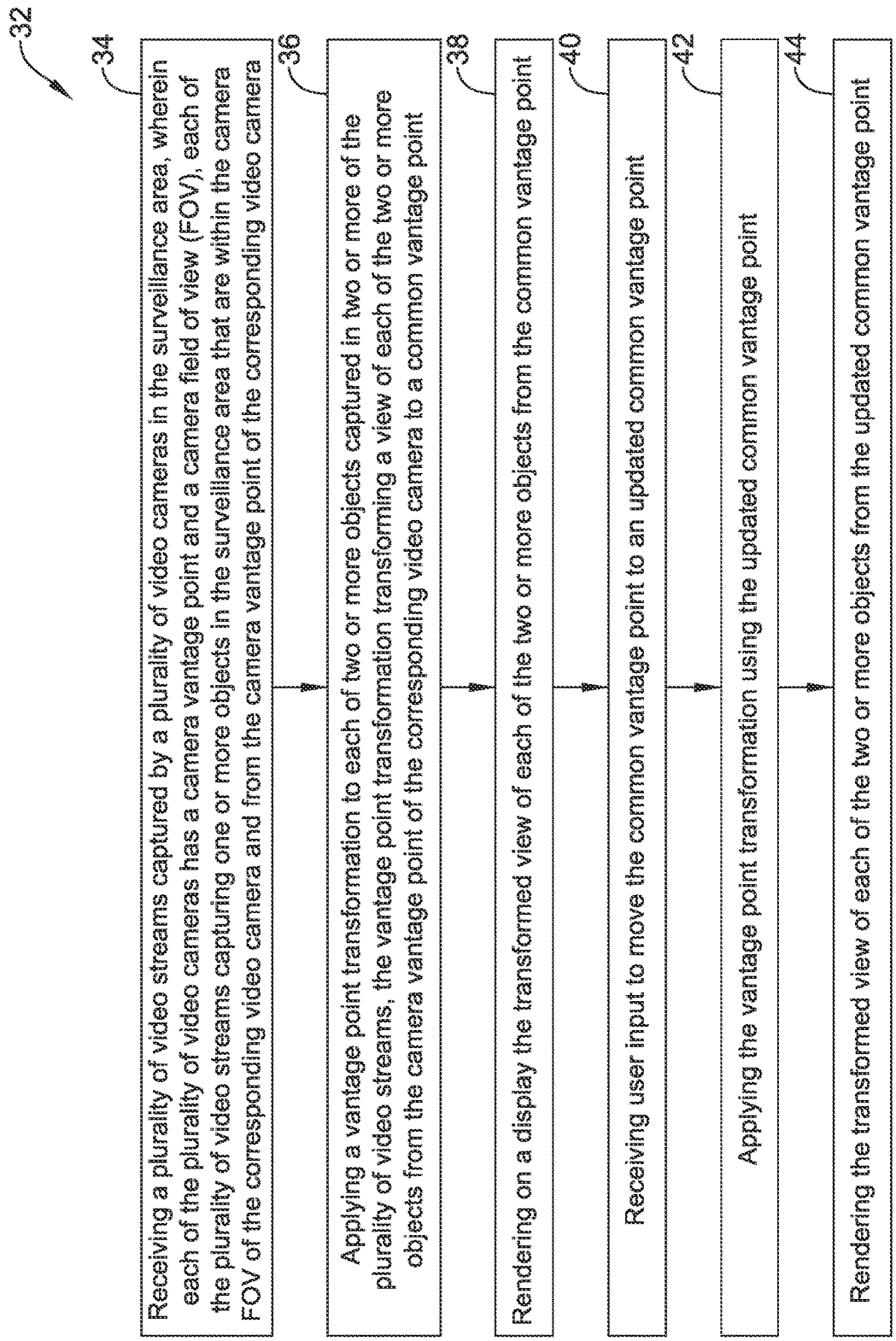

FIG. 3 is a flow diagram showing an illustrative method 32 for monitoring a surveillance area. The method 32 includes receiving a plurality of video streams captured by a plurality of video cameras (such as the video cameras 14) in the surveillance area, wherein each of the plurality of video cameras has a camera vantage point (such as the vantage point 16) and a camera field of view (FOV) (such as the FOV 18. Each of the plurality of video streams capturing one or more objects in the surveillance area that are within the camera FOV of the corresponding video camera and from the camera vantage point of the corresponding video camera, as indicated at block 34. A vantage point transformation may be applied to each of two or more objects captured in two or more of the plurality of video streams, the vantage point transformation transforming a view of each of the two or more objects from the camera vantage point of the corresponding video camera to a common vantage point, as indicated at block 36. In some cases, the view of each of the two or more objects are transformed and rendered from the common vantage point at a first frame rate. The transformed view of each of the two or more objects from the common vantage point may be rendered on a display, as indicated at block 38.

In some instances, the method 32 includes receiving user input to move the common vantage point to an updated common vantage point, as indicated at block 40. In some cases, moving the common vantage point may include one or more of panning, zooming, titling and rotating. As an example, it may be possible to zoom in the common vantage point to a zoomed in updated common vantage point. A vantage point transformation may be applied using the updated common vantage point, as indicated at block 42. The transformed view of each of the two or more objects may be rendered from the updated common vantage point, as indicated at block 44. In some cases, a view of the two or more objects from a zoomed in updated common vantage point may be rendered at a second frame rate that is higher than the first frame rate.

Figure 4:
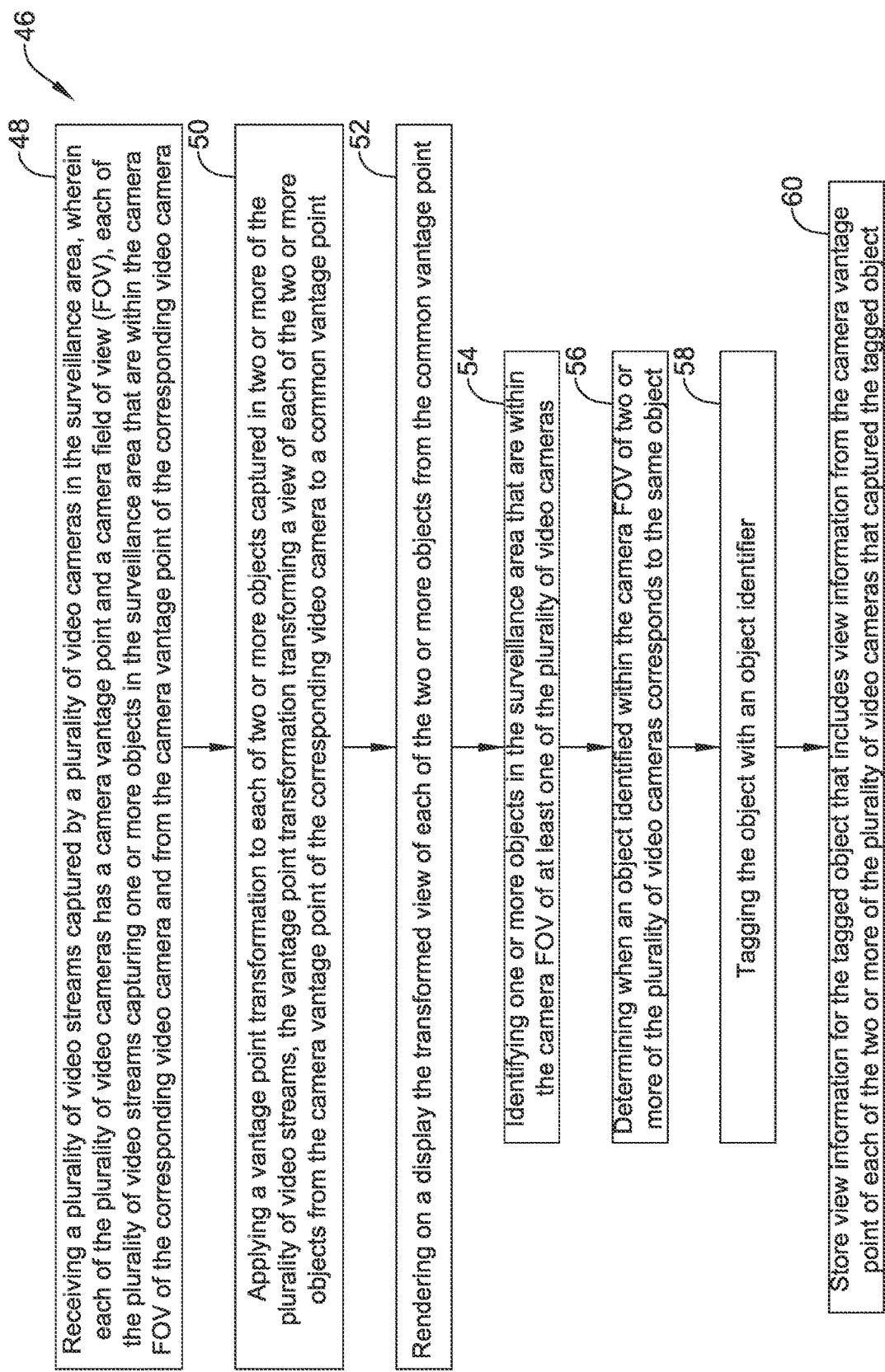

FIG. 4 is a flow diagram showing an illustrative method 46 for monitoring a surveillance area. The method 46 includes receiving a plurality of video streams captured by a plurality of video cameras (such as the video cameras 14) in the surveillance area, wherein each of the plurality of video cameras has a camera vantage point (such as the vantage point 16) and a camera field of view (FOV) (such as the FOV 18). Each of the plurality of video streams capturing one or more objects in the surveillance area that are within the camera FOV of the corresponding video camera and from the camera vantage point of the corresponding video camera, as indicated at block 48. A vantage point transformation may be applied to each of two or more objects captured in two or more of the plurality of video streams. The vantage point transformation transforming a view of each of the two or more objects from the camera vantage point of the corresponding video camera to a common vantage point, as indicated at block 50. In some cases, the view of each of the two or more objects are transformed and rendered from the common vantage point at a first frame rate. The first frame rate may depend on the number of objects and the number of video cameras that are of interest. The fewer the objects and/or video cameras that are of interest (e.g. a zoomed in common vantage point and the smaller field of view may have fewer objects and fewer video cameras that are of interest), the higher the frame rate. The transformed view of each of the two or more objects from the common vantage point may be rendered on a display, as indicated at block 52.

In some cases, the method 46 may further include identifying one or more objects in the surveillance area that are within the camera FOV of at least one of the plurality of video cameras, as indicated at block 54. A determination is made as to when an object identified within the camera FOV of two or more of the plurality of video cameras corresponds to the same object, as indicated at block 56. The object is tagged with an object identifier, as indicated at block 58. The view information for the tagged object is stored that includes view information from the camera vantage point of each of the two or more of the plurality of video cameras that captured the tagged object over time, as indicated at block 60. The view information may, for example, include view information captured from different cameras and at different times. In some cases, the vantage point transformation transforms the view information to the common vantage point.

Figure 5:
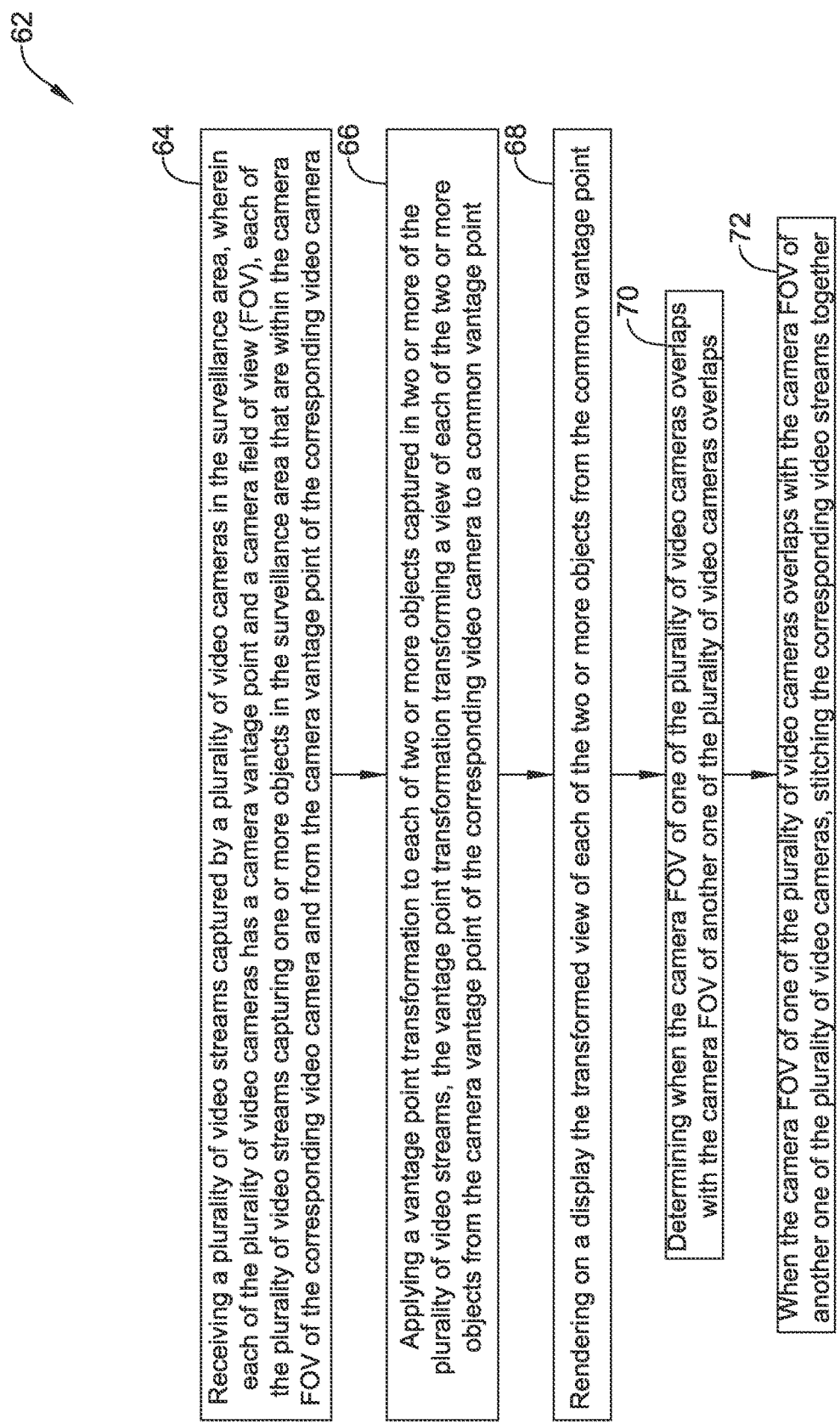

FIG. 5 is a flow diagram showing an illustrative method 62 for monitoring a surveillance area. The method 62 includes receiving a plurality of video streams captured by a plurality of video cameras (such as the video cameras 14) in the surveillance area, wherein each of the plurality of video cameras has a camera vantage point (such as the vantage point 16) and a camera field of view (FOV) (such as the FOV 18). Each of the plurality of video streams capturing one or more objects in the surveillance area that are within the camera FOV of the corresponding video camera and from the camera vantage point of the corresponding video camera, as indicated at block 64. A vantage point transformation may be applied to each of two or more objects captured in two or more of the plurality of video streams, the vantage point transformation transforming a view of each of the two or more objects from the camera vantage point of the corresponding video camera to a common vantage point, as indicated at block 66. In some cases, the view of each of the two or more objects are transformed and rendered from the common vantage point at a first frame rate. The first frame rate may depend on the number of objects and the number of video cameras that are of interest. The fewer the objects and/or video cameras that are of interest (e.g. a zoomed in common vantage point and the smaller field of view may have fewer objects and fewer video cameras that are of interest), the higher the frame rate. The transformed view of each of the two or more objects from the common vantage point may be rendered on a display, as indicated at block 68.

In some cases, the method 62 further includes determining when the camera FOV of one of the plurality of video cameras overlaps with the camera FOV of another one of the plurality of video cameras, as indicated at block 70. When the camera FOV of one of the plurality of video cameras overlaps with the camera FOV of another one of the plurality of video cameras, the corresponding video streams are stitched together, as indicated at block 72.

Figure 6:
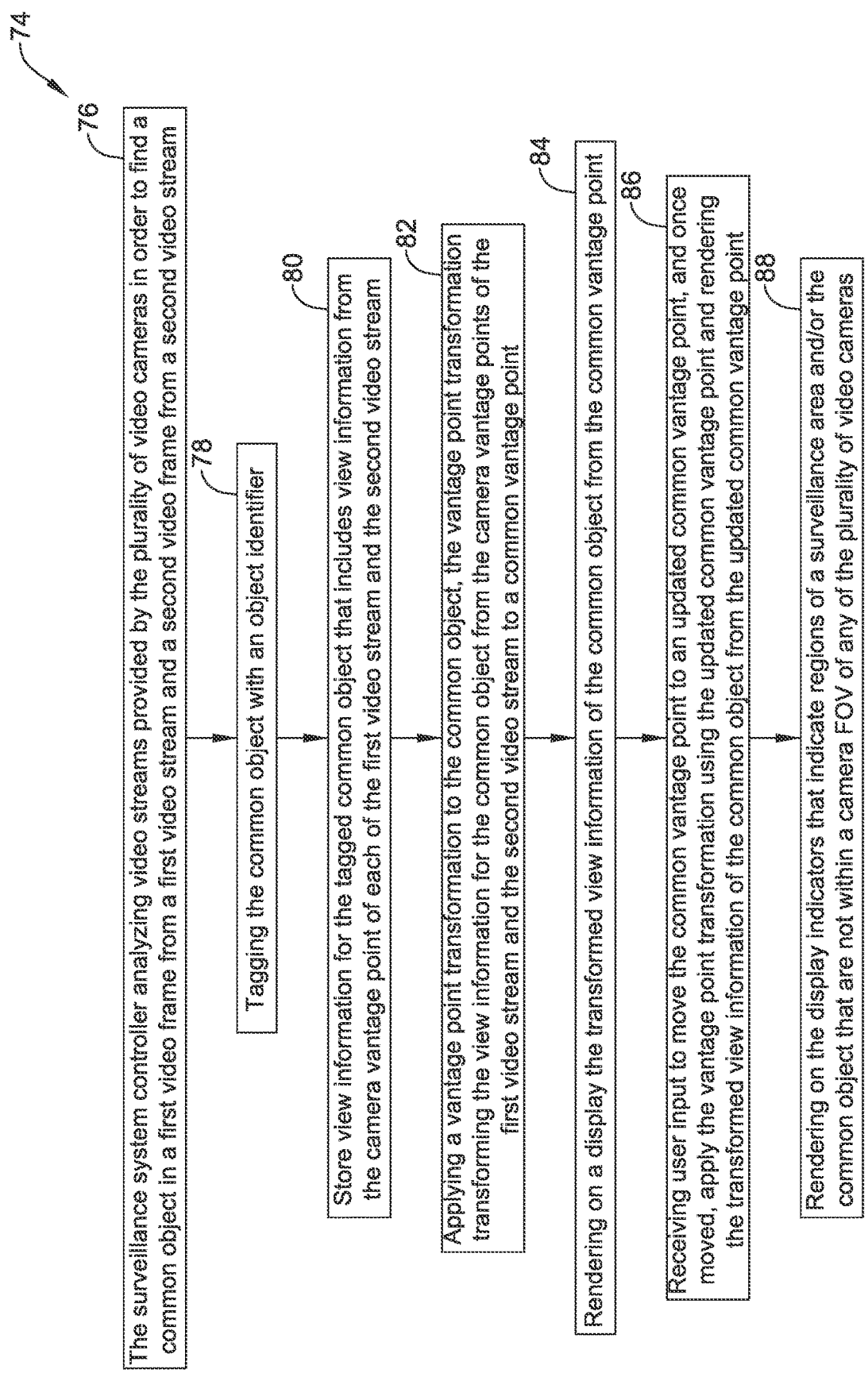

FIG. 6 is a flow diagram showing an illustrative method 74 of operating a surveillance system that includes a plurality of video cameras (such as the video cameras 14) each configured to provide video streams from a corresponding camera vantage point, the surveillance system including a surveillance system controller. The method 74 includes the surveillance system controller analyzing video streams provided by the plurality of video cameras in order to find a common object in a first video frame from a first video stream and a second video frame from a second video stream, as indicated at block 76. The common object is tagged with an object identifier, as indicated at block 78. View information for the tagged common object that includes view information from the camera vantage point of each of the first video stream and the second video stream is stored, as indicated at block 80. A vantage point transformation is applied to the common object, the vantage point transformation transforming the view information for the common object from the camera vantage points of the first video stream and the second video stream to a common vantage point, as indicated at block 82. The transformed view information of the common object from the common vantage point is rendered on a display, as indicated at block 84.

In some instances, the method 74 may further include receiving user input to move the common vantage point to an updated common vantage point, and once moved, applying the vantage point transformation using the updated common vantage point and rendering the transformed view information of the common object from the updated common vantage point, as indicated at block 86. The transformed view information of the common object from the common vantage point may be rendered at a first frame rate. The transformed view information of the common object from the updated common vantage point may be rendered at a second frame rate that is different from the first frame rate. The method 74 may further include rendering on the display indicators that indicate regions of a surveillance area and/or regions of the common object that are not within a camera FOV of any of the plurality of video cameras.

Figure 7:
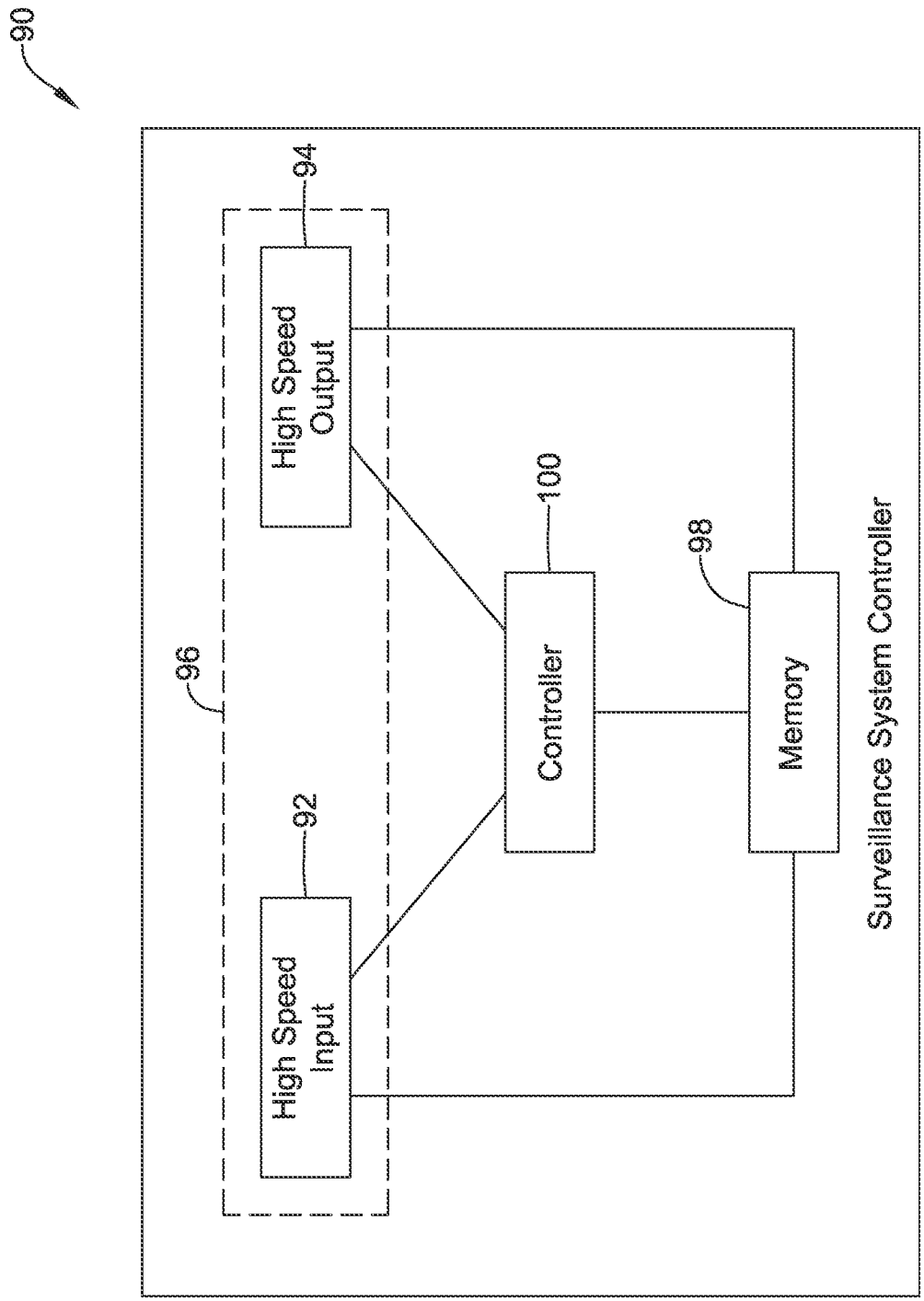
FIG. 7 is a schematic block diagram of an illustrative surveillance system controller.

FIG. 7 is a schematic block diagram of an illustrative surveillance system controller 90. The surveillance system controller 90 may be considered as being an example of the surveillance system controller 12. The surveillance system controller 90 may be operably coupled with the plurality of video cameras 14 via a high speed wireless network such as but not limited to a 5G cellular network. When so provided, the surveillance system controller 90 includes a high speed input 92 that is configured to receive video streams from one or more of the plurality of video cameras via a high speed wireless network. In some cases, the surveillance system controller 90 also includes a high speed output 94 that is operably coupled with a high speed wireless network for outputting images such a videos, for example. In some instances, the high speed input 92 and the high speed output 94 may in combination be considered as forming a transceiver 96, which can provide two-way communication. A memory 98 is operably coupled with the high speed input 92 and is configured to store received video streams. A controller 100 is operably coupled to the high speed input 92 and to the memory 98. The controller 100 is configured to carry out a number of methods, such as those outlined in FIGS. 8 and 9.

FIG. 8 is a flow diagram showing an illustrative method 102 that may be orchestrated by the controller 100 and thus carried out by the surveillance system controller 90. The controller 100 may be configured to analyze each of the video streams in order to find a first common landmark in both a first video frame from a first video stream and a second video frame from a second video stream, as indicated at block 104. When the first common landmark is present in both the first video frame from the first video stream and the second video frame from the second video stream, the controller 100 is configured to stitch together the first video frame from the first video stream and the second video frame from the second video stream and placing the stitched together image into a master image, as indicated at block 106. When there is no first common landmark present in both the first video frame from the first video stream and the second video frame from the second video stream, the controller 100 is configured to populate the master image with the first video frame from the first video stream and the second video frame from the second video stream with each of the first video frames disposed within the master image at relative locations corresponding to physical locations of the views included in the first video frame and the second video frame, as indicated at block 108. The master image is translated into a top view (or other birds eye view) of the master image, as indicated at block 110.

In some instances, the controller 100 may also be configured to analyze each of the video streams in order to find a second common landmark in both the second video frame from the second video stream and a third video frame from a third video stream, as indicated at 112. When the second common landmark is present in both the second video frame from the second video stream and the third video frame from the third video stream, the controller 100 may be configured to stitch together the second video frame from the second video stream and the third video frame from the third video stream and placing the stitched together image into the master image, as indicated at block 114. When there is no second common landmark present in both the second video frame from the second video stream and the third video frame from the third video stream, the controller 100 may be further configured to populate the master image with the third video frame from the third video stream with the third video frame disposed within the master image at a relative location corresponding to a physical location of the view included in the third video frame, as indicated at block 116.

In some cases, as indicated, at least some of the video cameras 14 may include video cameras that have an adjustable field of view (FOV). The controller 100 may be configured to send commands to adjust the FOV of one or more of the video cameras 14 having an adjustable FOV. When some of the video cameras 14 include mobile video cameras that may be secured relative to drones, the controller 100 may be configured to provide instructions to a particular mobile video camera (e.g. drone) to move to a particular location. In some cases, the controller 100 and/or the mobile video camera itself may be configured to estimate an optimal time for capturing a live video stream as the one or more of the mobile video cameras approach and/or pass beyond the particular location.

In some cases, the controller 100 may be configured to enable display of a location within the top view of the master image from any of a plurality of different vantage points. The plurality of different vantage points may include different locations on the ground as represented in an X-Y plane, for example. The plurality of different vantage points may include different heights in a Z plane that is orthogonal to the X-Y plane, as an example. The controller 100 may be configured to create and store a plurality of top views of master images based on video streams received from the plurality of video cameras over a period of time and to display a selected top view of a master image corresponding to a point in time within the period of time. The controller 100 may be configured to enable display of a location within the selected top view of the master image corresponding to the point in time from any of a plurality of different vantage points.

FIG. 9 is a flow diagram showing an illustrative method 118 of operating a surveillance system that includes a plurality of video cameras (such as the video cameras 14) configured to provide video streams, the surveillance system including a surveillance system controller (such as the surveillance system controller 12, 90). The method 118 includes the surveillance system controller analyzing video streams provided by the plurality of video cameras in order to find a common landmark in a first video frame from a first video stream and a second video frame from a second video stream, as indicated at block 120. When the common landmark is present in both the first video frame from the first video stream and the second video frame from the second video stream, the surveillance system controller stitches together the first video frame from the first video stream and the second video frame from the second video stream and placing the stitched together image into a master image, as indicated at block 122. When there is no common landmark present in both the first video frame from the first video stream and the second video frame from the second video stream, the surveillance system controller populates the master image with the first video frame from the first video stream and the second video frame from the second video stream with each of the first video frames disposed within the master image at relative locations corresponding to physical locations of the views included in the first video frame and the second video frame, as indicated at block 124. The surveillance system controller translates the master image into a top view of the master image, as indicated at block 126.

Figure 10:
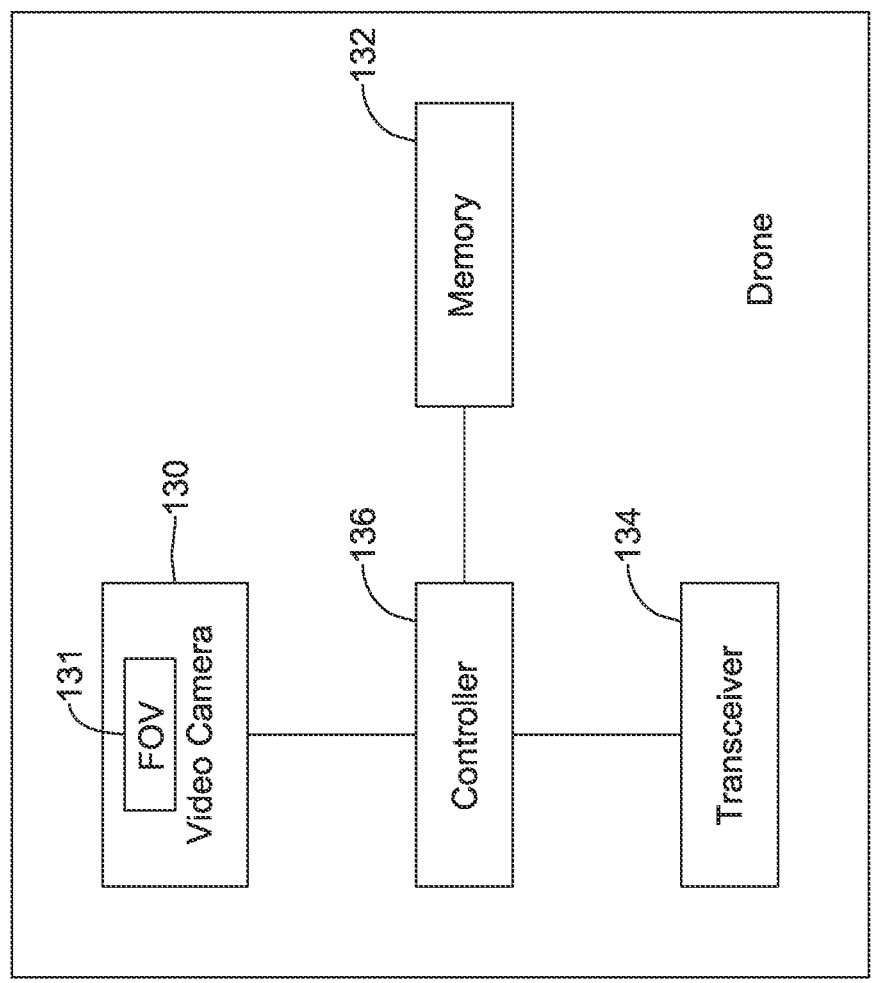
FIG. 10 is a schematic block diagram showing an illustrative drone.
Figure 11:
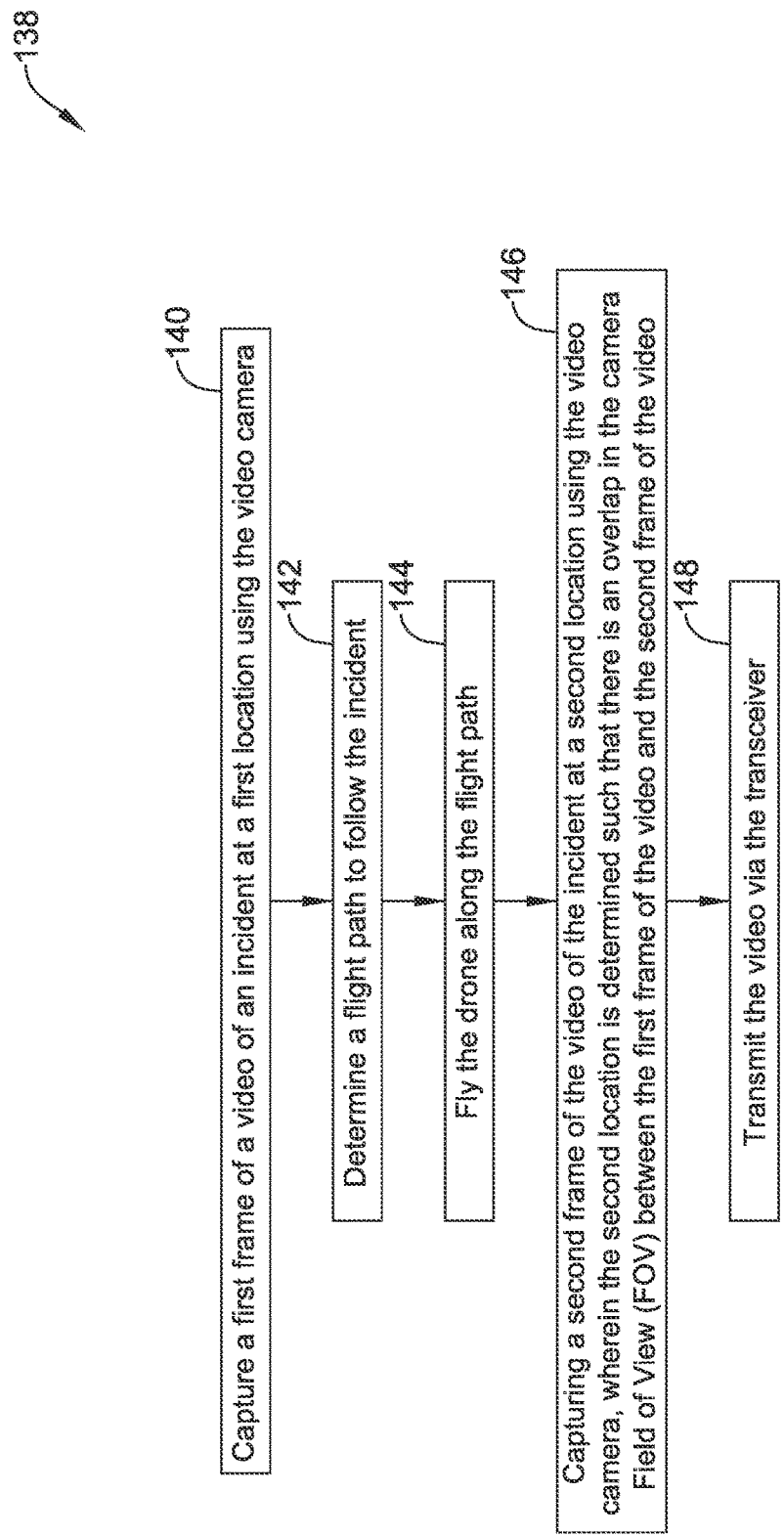
FIGS. 11 and 12 are flow diagrams showing illustrative methods that may be carried out by the illustrative drone of FIG. 10.
Figure 12:
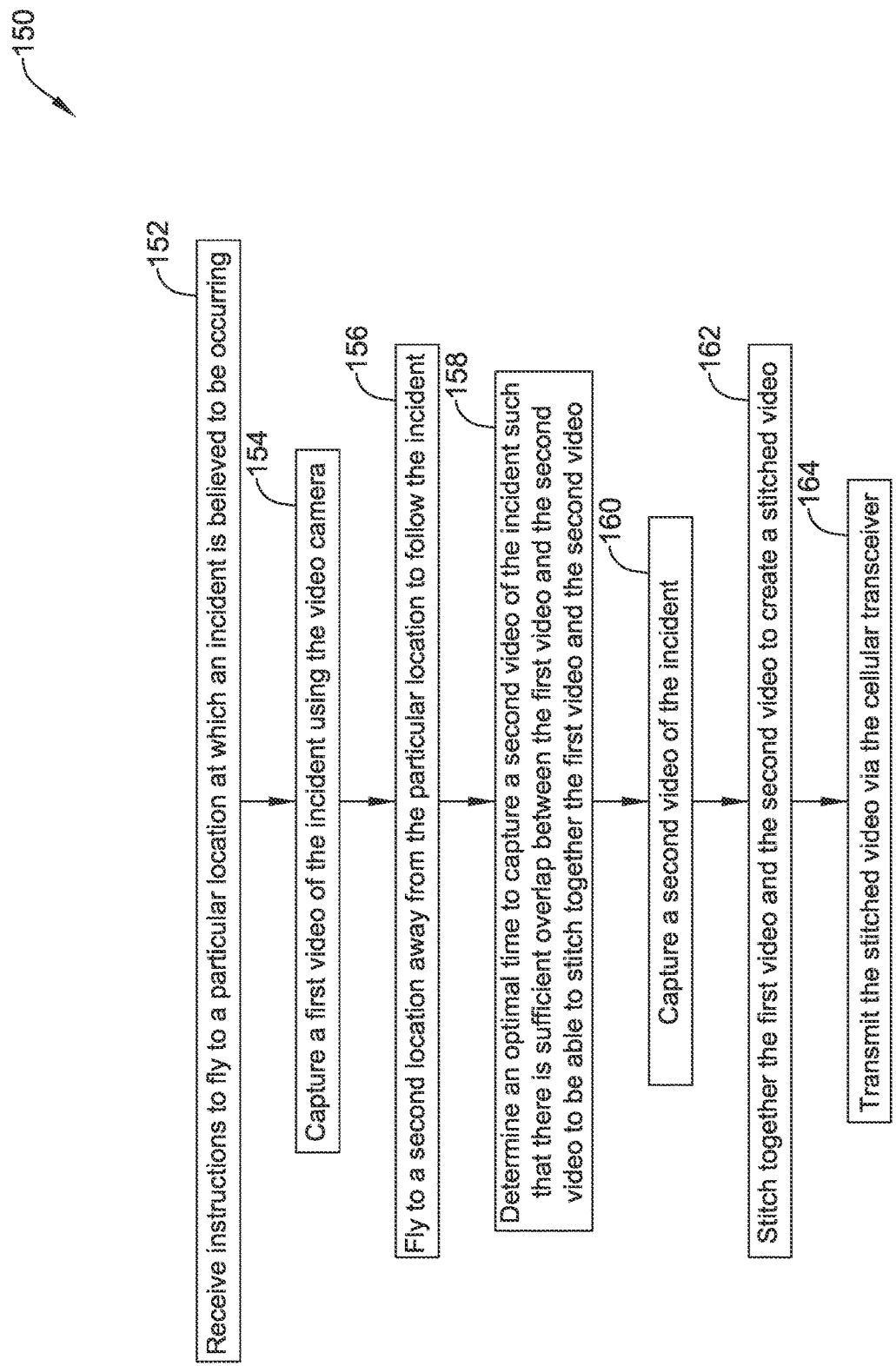

FIG. 10 is a schematic block diagram of a drone 128 that is configured for use in a surveillance system (such as the surveillance system 10) that includes a plurality of video cameras (such as the video cameras 14) disposed within a surveillance area. The drone 128 includes a video camera 130, a memory 132, a transceiver 134 and a controller 136 that is operably coupled to the video camera 130, the memory 132 and the transceiver 134. In some cases, the video camera 130 may be considered as including a camera field of view (FOV) 131. The transceiver 134 may be a cellular transceiver such as but not limited to a 5G cellular transceiver, for example. The controller 136 may be considered as being configured to control operation of the drone, including operation of the drone's flying capability as well as the video camera 130. FIGS. 11 and 12 are flow diagrams showing illustrative methods that may be orchestrated by the controller 136 and thus carried out by the drone 128.

FIG. 11 is a flow diagram showing an illustrative method 138 that the controller 136 of the drone 128 may be configured to carry out. A first frame of a video of an incident at a first location is captured using the video camera, as indicated at block 140. A flight path to follow the incident is determined, as indicated at block 142. The drone is flown along the flight path, as indicated at block 144. A second frame of the video of the incident at a second location is captured using the video camera, wherein the second location is determined such that that there is an overlap in the camera Field of View (FOV) between the first frame of the video and the second frame of the video, as indicated at block 146. The video is transmitted via the transceiver, as indicated at block 148. In some cases, a frame rate of the video is dynamic and may be dependent on a speed of the drone flying along the flight path. In some cases, the frame rate may be dependent on an altitude of the drone flying along the flight path.

FIG. 12 is a flow diagram showing an illustrative method 150 that the controller 136 of the drone 128 may be configured to carry out. Instructions are received to fly to a particular location at which an incident is believed to be occurring, as indicated at block 152. A first video of the incident is captured using the video camera, as indicated at block 154. The controller 136 is configured to fly the drone to a second location away from the particular location to follow the incident, as indicated at block 156. The controller 136 is configured to determine a time to capture a second video of the incident such that there is sufficient overlap between the first video and the second video to be able to stitch together the first video and the second video, as indicated at block 158. The controller 136 is configured to capture a second video of the incident, as indicated at block 160, and to stitch together the first video and the second video to create a stitched video, as indicated at block 162. The controller 136 is configured to transmit the stitched video via the cellular transceiver (e.g. 5G transceiver), as indicated at block 164.

Figure 13:
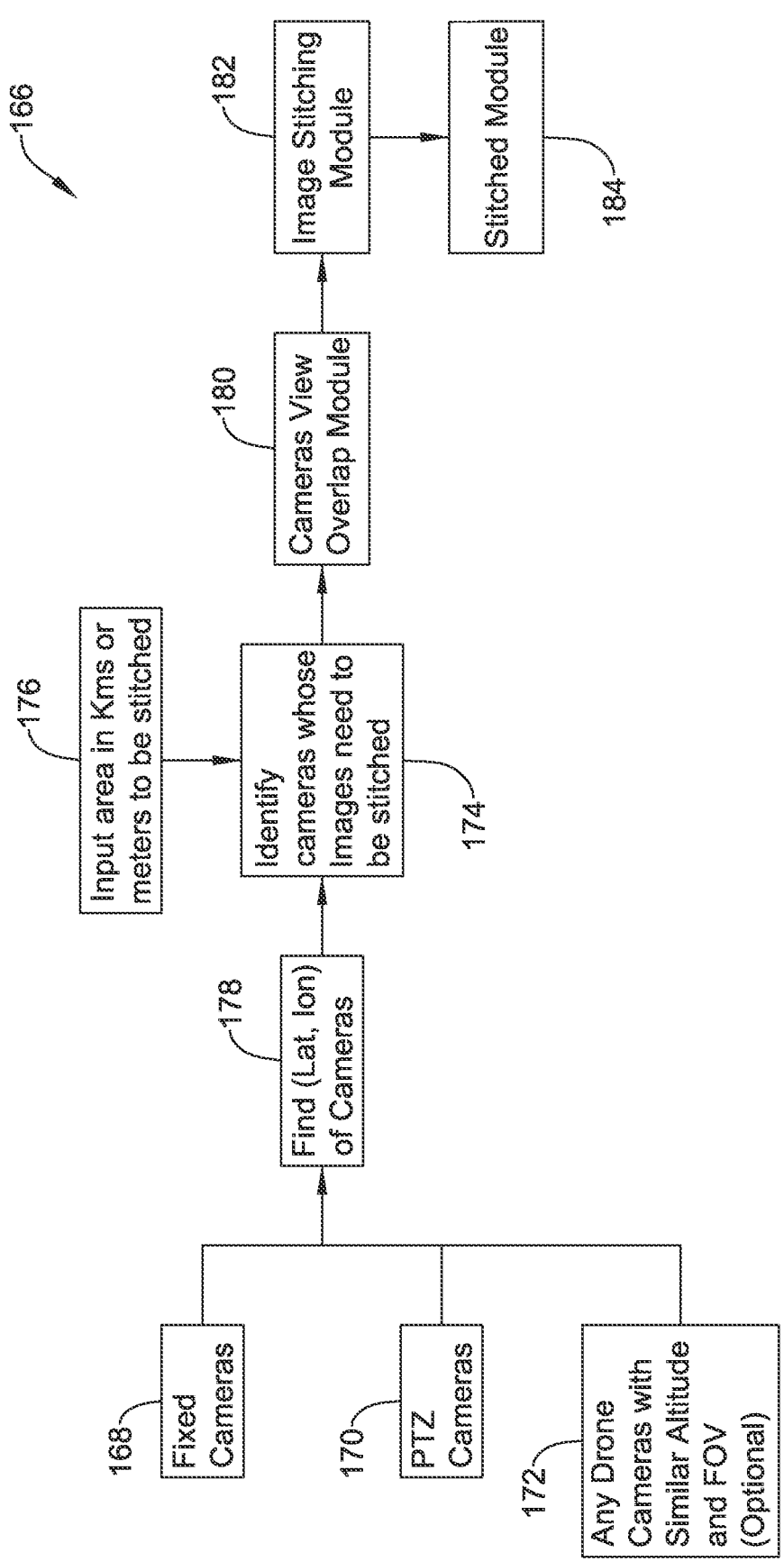

FIG. 13 is a flow diagram showing an illustrative method 166 for determining when and how to stitch videos together. As seen, the method 166 can work with videos provided by any of fixed cameras 168, PTZ cameras 170 and drone cameras 172, particularly if the drone cameras 172 are carried by drones having an altitude that is similar to that of the fixed cameras 168 and/or the PTZ cameras 170. In some cases, the drone cameras 172 having similar fields of view (FOV) may also play a part. At block 174, cameras whose images can and should be stitched together are identified. Block 174 receives as inputs details regarding the surveillance area of interest, as indicated at block 176, as well as physical locations of the cameras, as indicated at block 178. The surveillance area of interest may be defined by the Field of View (FOV) of the particular birds eye view currently selected by an operator of the surveillance system 10. The cameras whose images that should be stitched together may include all of the cameras that have a FOV that overlap with the field of view of the particular birds eye view currently selected by the operator of the surveillance system 10. As the operator zooms in, the FOV of the birds eye view currently selected by the operator is reduced in size, and thus fewer cameras whose images should be stitched together may be identified. When fewer cameras are involved, a given set of processing resources can stitch together more frames, and the stitched together video may be rendered at a higher frame rate on an operator display.

In some cases, camera locations may be specified in terms of latitude and longitude, although other identifying criteria such as GPS coordinates may also be used. A camera view overlap module 180 determines which camera views are overlapping and which are not overlapping. Overlapping views are stitched together in the image stitching module 182, resulting in a stitched image or stitched frame 184. Non-overlapping views are aggregated into a final view, either as is, or transformed into a top or other birds eye view.

Figure 14:
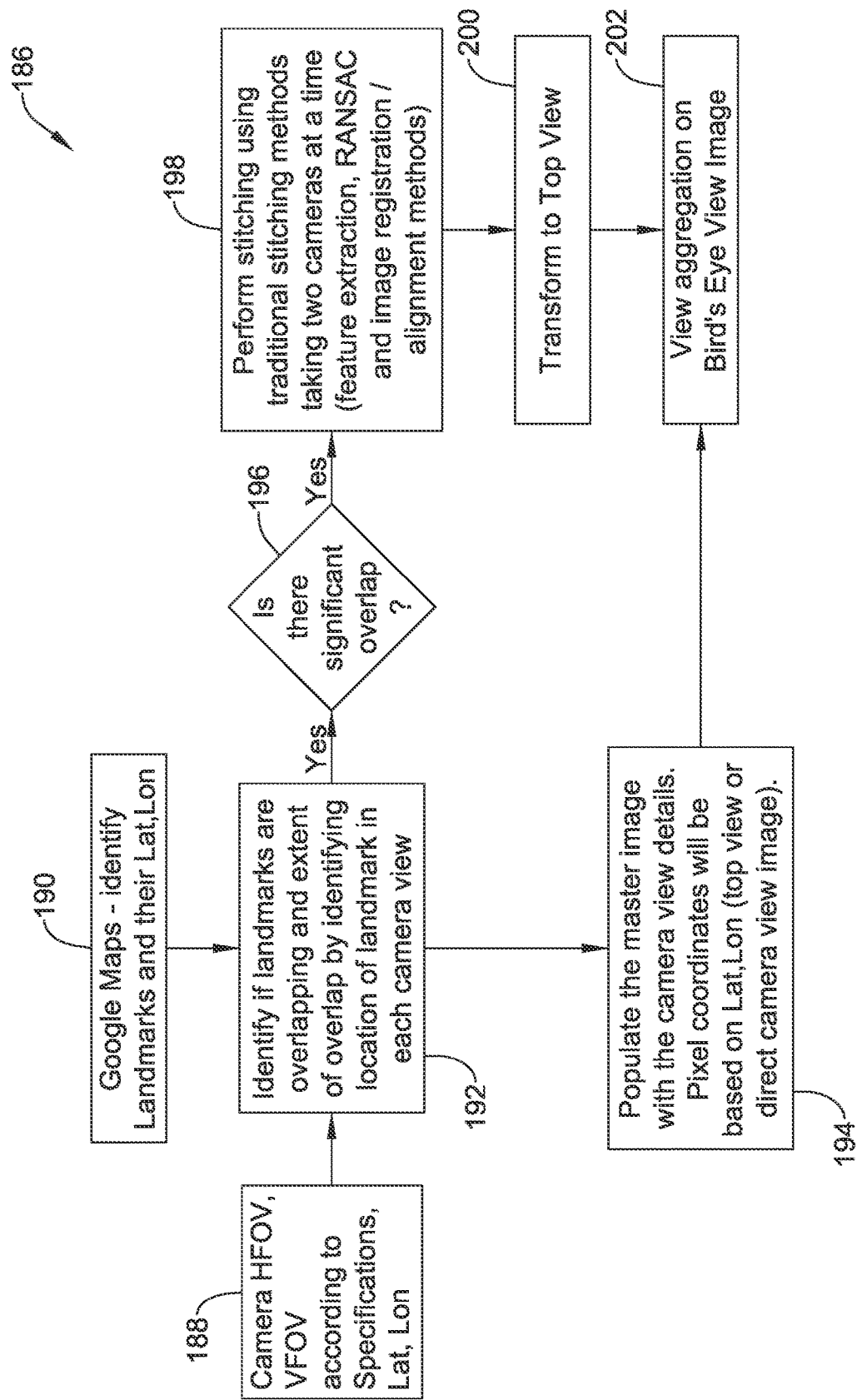

FIG. 14 is a flow diagram showing an illustrative method 186 of stitching views together, and may be considered as providing additional detail regarding the functionality of the camera view overlap module 180 and the image stitching module 182. The illustrative method 186 includes as inputs the horizontal field of view (HFOV) and the vertical field of view (VFOV) of each of the video cameras, in accordance with specifications, as well as the physical locations of each of the cameras, as indicated at block 188. Google maps or a similar engine may be used to identify landmarks and their physical locations, as indicated at block 190. These are provided as inputs to block 192, where a determination is made as to whether landmarks in the various camera views are overlapping and how much. This can be determined at least in part by identifying landmark locations within each camera view. If there is no overlap among landmarks in the various camera views, control passes to block 194, where a master image is populated with the camera view details. Conversely, if landmarks do overlap in some of the camera views, control passes to decision block 196 where a determination is made as to whether there is substantial overlap. If so, control passes to block 198 where stitching occurs. At block 200, a transformation to a top or other birds eye view is performed in accordance with known methods, and is viewed as indicated at block 202.

FIG. 15 is a flow diagram showing an illustrative method 204. As shown at 206, a drone is flown from a position P1 at time t1 to a position P2 at time t2. At time t1, the drone's field of view is from A to B. At time t2, the drone's field of view is from C to D. The method 204 includes, at position P1 (as indicated at block 208), ascertaining the drone's height and camera FOV, as indicated at block 210. A first image is captured at position P1, as indicated at block 212. A maximum range is calculated at block 214 and a position E (with reference to 206) is determined as indicated at block 216. In some cases, the position E may correspond to eighty percent of the maximum range divided by two. This enables some distance to be traveled between images while still allowing for sufficient overlap between successive images. At block 218, a predicted position P2 is determined. This may include as inputs the location (such as latitude and longitude) of the drone at time t1, as indicated at 218*a*; the speed of movement as indicated at 218*b*, the drone's altitude as indicated at 218*c* and the yaw, pitch and roll of the drone, as indicated at 218*d*. A second image is captured at the predicted position P2 as indicated at block 220. The first and second images are provided to image stitching algorithms 222 and then to a block 224 where a panoramic view is provided.

FIG. 16 is a schematic block diagram showing a series 226 of steps that may be carried out as part of conducting a search. At block 228, a search query may be received from an operator. The search query may take a variety of forms, and could for example include a request to search for a male who is 60 to 75 inches tall, wearing a red shirt and carrying a black briefcase, for example. The search query could include a request to search for a yellow car that was seen passing through a particular intersection within a particular time window. The search query could include a request to search for gatherings of more than twenty people, for example. At block 230, videos are searched to look for objects that match the search query. At block 232, the location of matching objects are displayed on a transformed view from a common vantage point at a first frame rate. At block 234, user input is received that zooms the common vantage point into a selected one of the matching objects. At block 236, the selected matching object from the zoomed-in vantage point is displayed at a second frame rate. In some cases, the second frame rate may be higher than the first frame rate.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for monitoring a surveillance area, the method comprising:
receiving a plurality of video streams captured by a plurality of video cameras in the surveillance area, wherein each of the plurality of video cameras has a camera vantage point and a camera field of view (FOV), each of the plurality of video streams capturing one or more objects in the surveillance area that are within the camera FOV of the corresponding video camera and from the camera vantage point of the corresponding video camera;
applying a vantage point transformation to each of the plurality of video streams, the vantage point transformation transforming a view of each of the plurality of video streams from the camera vantage point of the corresponding video camera to a common vantage point;
rendering on a display the transformed view of each of the plurality of video streams from the common vantage point, wherein the transformed view of each of the plurality of video streams is transformed and rendered from the common vantage point at a first frame rate;
receiving user input to zoom in the common vantage point to a zoomed in updated common vantage point, and in response, apply the vantage point transformation using the zoomed in updated common vantage point and rendering the transformed view of each of two or more of the plurality of video streams from the zoomed in updated common vantage point, wherein the transformed view of each of the two or more of the plurality of video streams is transformed and rendered on the display from the zoomed in updated common vantage point at a second frame rate, wherein the second frame rate is higher than the first frame rate.

2. The method of claim 1, wherein receiving user input includes receiving user input to pan and/or rotate the common vantage point in addition to zooming in the common vantage point.

3. The method of claim 1, further comprising rendering on the display indicators that indicate regions of the surveillance area that are not within the camera FOV of any of the plurality of video cameras.

4. The method of claim 1, further comprising rendering on the display indicators that indicate regions of objects that are not within the camera FOV of any of the plurality of video cameras.

5. The method of claim 1, further comprising:
identifying one or more objects in the surveillance area that are within the camera FOV of at least one of the plurality of video cameras;
determining when an object identified within the camera FOV of two or more of the plurality of video cameras corresponds to the same object;
tagging the object with an object identifier; and
store view information for the tagged object that includes view information from the camera vantage point of each of the two or more of the plurality of video cameras that captured the tagged object.

6. The method of claim 5, wherein the vantage point transformation transforms the view information for each of the two or more objects from the camera vantage point of the corresponding video camera to the common vantage point.

7. The method of claim 5, wherein the view information includes view information captured at different times.

8. The method of claim 1, further comprising:
determining when the camera FOV of one of the plurality of video cameras overlaps with the camera FOV of another one of the plurality of video cameras; and
when the camera FOV of one of the plurality of video cameras overlaps with the camera FOV of another one of the plurality of video cameras, stitching the corresponding video streams together.

9. A method of operating a surveillance system that includes a plurality of video cameras each configured to provide video streams from a corresponding camera vantage point, the surveillance system including a surveillance system controller, the method comprising:
the surveillance system controller analyzing video streams provided by the plurality of video cameras in order to find a common object in a first video frame from a first video stream and a second video frame from a second video stream;
tagging the common object with an object identifier;
store view information for the tagged common object that includes view information from the camera vantage point of each of the first video stream and the second video stream;
applying a vantage point transformation to the common object, the vantage point transformation transforming the view information for the common object from the camera vantage points of the first video stream and the second video stream to a common vantage point;
rendering on a display the transformed view information of the common object from the common vantage point;
receiving user input to zoom in the common vantage point to a zoomed in updated common vantage point, and in response, apply the vantage point transformation using the zoomed in updated common vantage point and rendering the transformed view information of the common object from the updated common vantage point; and
wherein the transformed view information of the common object from the common vantage point is rendered at a first frame rate, and the transformed view information of the common object from the zoomed in updated common vantage point is rendered at a second frame rate that is higher than the first frame rate.

10. The method of claim 9, further comprising rendering on the display indicators that indicate regions of a surveillance area that are not within a camera FOV of any of the plurality of video cameras.

11. The method of claim 9, further comprising rendering on the display indicators that indicate regions of the common object that are not within a camera FOV of any of the plurality of video cameras.

12. A drone configured for use in a surveillance system, the drone comprising:

a video camera having a camera Field of View (FOV);
a memory;
a transceiver;
a controller operably coupled to the video camera, the memory and the transceiver, the controller configured to:
  capture a first frame of a video of an incident at a first location using the video camera;
  determine a flight path to follow the incident,
  fly the drone along the flight path;
  capturing successive frames of the video of the incident following the first frame at successive locations along the flight path using the video camera, wherein the successive locations are determined to achieve a predefined overlap in the camera Field of View (FOV) between the successive frames of the video, thereby resulting in a frame rate of the video that is dynamic and dependent on a speed of the drone flying along the flight path; and
  transmit the video via the transceiver.

13. The drone of claim 12, wherein a frame rate of the video is dynamic and is dependent on an altitude of the drone flying along the flight path.

14. The drone of claim 12, wherein the transceiver is a cellular transceiver.

* * * * *